United States Patent [19]

Coleman et al.

[11] Patent Number: 5,434,623
[45] Date of Patent: Jul. 18, 1995

[54] METHOD AND APPARATUS FOR IMAGE DATA COMPRESSION USING COMBINED LUMINANCE/CHROMINANCE CODING

[75] Inventors: Charles H. Coleman, Redwood City; Sidney D. Miller, Mountain View; Peter Smidth, Menlo Park, all of Calif.

[73] Assignee: Ampex Corporation, Redwood City, Calif.

[21] Appl. No.: 811,486

[22] Filed: Dec. 20, 1991

[51] Int. Cl.6 .............................................. H04N 7/30
[52] U.S. Cl. ....................................... 348/405; 348/27
[58] Field of Search ........................ 358/13, 133, 136; H04N 7/130, 7/133; 348/27, 405

[56] References Cited

U.S. PATENT DOCUMENTS

| | | | |
|---|---|---|---|
| 3,795,763 | 3/1974 | Golding ............................ 178/5.6 |
| 3,803,348 | 4/1974 | Limb .................................. 178/5.4 |
| 4,023,199 | 5/1977 | Netravali et al. ................. 358/13 |
| 4,025,950 | 5/1977 | Matsumoto ....................... 358/133 |
| 4,068,258 | 1/1978 | Bied-Charreton .................. 358/4 |
| 4,141,034 | 2/1979 | Netravali et al. ................. 358/13 |
| 4,175,270 | 11/1979 | Zenzefilis ........................ 358/133 |
| 4,204,227 | 5/1980 | Gurley .............................. 358/138 |
| 4,302,775 | 11/1981 | Widergren et al. ............ 358/136 |
| 4,383,272 | 5/1983 | Netravali et al. ............... 358/136 |
| 4,394,774 | 7/1983 | Widergren et al. ............ 382/56 |
| 4,447,886 | 5/1984 | Meeker ............................ 364/725 |
| 4,494,144 | 1/1985 | Brown ............................. 358/133 |
| 4,504,860 | 3/1985 | Nicol et al. ..................... 358/133 |
| 4,541,012 | 9/1985 | Teacher ........................... 358/133 |
| 4,580,134 | 4/1986 | Campbell et al. .............. 340/703 |
| 4,626,829 | 12/1986 | Hauck ............................. 340/347 |
| 4,654,696 | 3/1987 | Dayton et al. .................. 358/11 |
| 4,672,427 | 6/1987 | Rzeszewski .................... 358/13 |
| 4,672,467 | 6/1987 | Heitmann ....................... 358/314 |
| 4,679,094 | 7/1987 | Rutherford et al. ........... 358/261 |
| 4,682,248 | 7/1987 | Schwartz ........................ 360/32 |
| 4,694,336 | 9/1987 | Keesen et al. ................. 358/133 |
| 4,698,694 | 10/1987 | Tomita et al. ................. 358/326 |
| 4,707,738 | 11/1987 | Ferre et al. .................... 358/136 |
| 4,740,832 | 4/1988 | Sprague et al. ................ 358/21 |
| 4,743,960 | 5/1988 | Duvic et al. .................... 358/13 |
| 4,758,881 | 7/1988 | Laspada ........................... 358/21 |
| 4,764,805 | 8/1988 | Rabbani et al. ................ 358/13 |
| 4,768,082 | 8/1988 | Hiratsuka et al. .............. 358/13 |

(List continued on next page.)

FOREIGN PATENT DOCUMENTS

0322058  6/1989  European Pat. Off. .

OTHER PUBLICATIONS

Huang, Y. et al, Block Quantization of Correlated Gaussian Random Variables, IEEE Trans. on Communication Systems, pp. 289–296, Sep. 1963.

Chen et al, "Color Image Coding with the Slant Transform", Applications of Walsh Functions, pp. 155–160, 1973, Washington, D.C.

(List continued on next page.)

*Primary Examiner*—Tommy P. Chin
*Assistant Examiner*—Richard Lee
*Attorney, Agent, or Firm*—John G. Mesaros; George B. Almeida

[57] ABSTRACT

A technique is provided for a color imaging system having a luminance component and two color difference (chrominance) components, which allots more space in the compressed data stream to the signal component of greater information content or complexity; that is, which combines the encoding of the components of the data representing a common portion of an image in response to the actual needs of the component, prior to encoding the combined data. To this end, the calculation of the quantizing factors considers the combined information content of both the luminance and chrominance components for the same image location. Thus, low chrominance complexity allows the transmission of more of the luminance information, and vice versa. The system also provides for predetermining the relative complexity of the signal components to thus pre-allot the amount of space for each signal component in the compressed data stream in proportion to its measured complexity.

9 Claims, 3 Drawing Sheets

U.S. PATENT DOCUMENTS

| | | |
|---|---|---|
| 4,774,562 | 9/1988 | Chen et al. ............................. 358/13 |
| 4,775,897 | 10/1988 | Umemoto et al. .................. 358/311 |
| 4,783,841 | 11/1988 | Crayson ................................ 382/56 |
| 4,797,741 | 1/1989 | Sato et al. ........................... 358/138 |
| 4,802,003 | 1/1989 | Takei et al. ......................... 358/133 |
| 4,847,677 | 7/1989 | Music et al. .......................... 358/13 |
| 4,849,807 | 7/1989 | Music et al. .......................... 358/13 |
| 4,857,991 | 8/1989 | Music et al. .......................... 358/13 |
| 4,862,167 | 8/1989 | Copeland, III ..................... 341/107 |
| 4,868,641 | 9/1989 | Modaresse ........................... 358/13 |
| 4,868,653 | 9/1989 | Golin et al. ........................ 358/133 |
| 5,006,931 | 4/1991 | Shirota ............................... 358/133 |
| 5,146,324 | 9/1992 | Miller et al. ....................... 358/133 |
| 5,185,655 | 2/1993 | Wakeland ............................ 358/13 |

OTHER PUBLICATIONS

Tsinberg et al, "Introduction of an NTSC Compatible HDTV System–HDS/NA", IEEE Transactions on Consumer Electronic, pp. 216–224, Aug. 1989, New York.

Wu et al, "Rate-Constrained Optimal Block-Adaptive Coding for Digital Tape Recording of HDTV", IEEE Transactions on circuits and Systems for Video Technology, pp. 100–112, 160–162, 1991, New York.

Tsai, Y. Tim, "Color Image Compression for Single–Chip Cameras", IEEE Transactions on Electron Devices, pp. 1226–1232, May, 1991, New York.

The D-2 Digital Video Recorder–John Watkinson.

An Experimental Study for Home–Use Digital VTR IEEE Trans. on Consumer Electronics vol. 35 No. 3 Aug. 1989.

Scene Adaptive Coder Trans. on Communications vol. Com. 32, No. 3 Mar. 1984.

Spatial Transactions on Comm. Technology vol. Com–19 No. 6 Dec. 1971.

A Bit Rate Controlled DCT Compression Algorithm for Digital Still Camera, M. Watanabe et al, SPIE vol. 1244, Image Proc'g Algorithms & Tech's, 1990.

METHOD AND APPARATUS FOR IMAGE DATA COMPRESSION USING COMBINED LUMINANCE/CHROMINANCE CODING

BACKGROUND OF THE INVENTION

This invention relates to real-time compression and encoding of digital video signals to provide for the transmission of compressed digital data through a communications channel, or for recording and playback of compressed data on a magnetic tape recorder or other recording medium. More particularly, the present invention relates to a technique for combining the encoding of, for example, the luminance and chrominance components of a common portion of an image, such that in a portion with less chrominance information content more luminance information is conveyed, and vice versa.

In general, the goal of data compression is to send digital information from one point to another through a transmission channel using the least amount of information transfer as is possible. In other words, the object is to eliminate the transmission of unnecessary information. Video images, by their very nature, contain a great deal of redundancy and thus are good candidates for data compression. A straight-forward digital representation of an image necessarily contains much of the same redundancy both in a spatial sense and a temporal sense. By removing a portion of the redundancy from the image data at the transmitter, the amount of data transmitted over a communications channel or recorded on a storage medium may be substantially reduced. The image, then may be reconstructed by reintroducing the redundancy at the receiver or, if recorded, in the recorder playback electronics. It is to be understood that the expression "image data" as used herein refers to data defining an image to be displayed in two dimensions, which further may take the form of a time varying image composed of multiple video frames which are equally spaced in time. Such a signal might be a moving scene derived from a video camera.

Image compression for use in conjunction with digital video tape recorders has several unique requirements which impose additional constraints on any compression method used. The additional constraints arise from the typical modes of use of a video tape recorder, and from the fact that the data must be stored for later use rather than immediately transmitted. For example, a tape recorder must allow editing of the recorded information. In a recording system where data is formatted in fixed length sync blocks, this means that the stored data for one field should occupy an integer number of tracks on the tape or occupy defined blocks of video data, such as a television field, at predictable locations or tracks on the tape. In a system where data is formatted in interleaved sync blocks, the editing requirement imposes the less stringent constraint that a field of video data fit within a space on tape corresponding to one field of video. Such seemingly simple constraints place a severe design requirement on any compression scheme. Because most images statistically are non-stationary (that is, the statistical distribution, or complexity, varies as a function of position within the image), the obvious solution to compressing a digital signal having varying information content would be to allow the encoded data rate to vary on a frame-by-frame or field-by-field temporal basis according to the image content. But because of editing requirements, the encoded data rate should be fixed rather than variable. Thus, in the edit mode, the replacement of recorded information by new information requires that the smallest unit of information to be replaced, such as a single field in a television signal, be allotted a fixed data block length in the recorded data format. This allows any unit of a video signal to be replaced with any equally sized unit of the video signal.

Video tape recorders for television broadcast applications must also allow pictures to be reproduced at higher than normal record/playback tape transport speeds (picture-in-shuttle). At the exceedingly higher playback speeds associated with the picture-in-shuttle mode, only a fraction of the data on each track is recovered. This requires that the compressed recorded data be stored in small complete data segments substantially smaller than one track in length, whereby a most significant portion of the picture may be recovered and individually decoded even at the higher speed.

Heretofore, various digital video compression studies have focussed on the two-dimensional discrete cosine transform (DCT) for use as the preferred adaptive coding vehicle, due to its superior performance in producing compressed images with low distortion over a wide range of images. (See "Discrete Cosine Transform," *IEEE Transaction on Computers*, vol. C-23, Pgs. 90–93, January 1974.) To perform a transformation on a video image, the image first is divided into blocks of contiguous pixels (e.g. 16×16 or 8×8), and then each block is cosine transformed into a set of transform coefficients, each of which represents a scalar weighting parameter (i.e., a coefficient) for a two-dimensional cosine transform function. In the cosine transform domain, the amplitude coefficients of non-zero value are concentrated at the lower frequency terms, with many of the upper frequencies being zero valued. Due to the nature of the transform and the existence of correlation in the original image, there is generally in the transformed image a large share of relatively small valued coefficients and a decreasing occurrence of large amplitude coefficients. Thus, if the coefficients are coarsely quantized into integral values and then Huffman coded, the number of bits needed to represent the image are greatly reduced.

More particularly, the quantizing factor is applied to the amplitude coefficients as follows. Each amplitude coefficient is scaled by the quantizing factor and rounded to the nearest integer. The integers obtained after the scaling and rounding are encoded using any of a number of entropy coding techniques, such as Huffman coding. Since the distribution of coefficient amplitudes has a high probability of being a small value, (a property of the transform as applied to images), short length code words are assigned to the smaller amplitudes to achieve the shortest overall message length. It can be seen that as the quantizing factor is increased, the resulting message length will decrease monotonically. Hence, an increase in the quantizing factor causes an increase in the compression. The errors due to quantizing also increase with increasing quantizing factor, leading to increased distortion in the decoded image. Thus, if the quantization is too fine, the data generated by the Huffman coder will exceed the data rate of the channel (or recorder), while too coarse a quantization results in unacceptable distortion/noise.

In some instances, such as one wherein the required data rate is obtained by simply controlling the fullness of an output buffer memory and using a feedback scheme to adjust the quantizing value to maintain an equilibrium of data in the buffer, a threshold level is applied to the transformed data coefficients. That is, all values below a certain threshold are considered to be zero. This thresholding also is often considered to be quantization, and as used herein the terminology applying a "quantization" or quantizing factor is meant to include applying a threshold level value, a scaling factor or other numerical processing parameter.

It generally is desirable to vary the quantizing parameters to produce the smallest increase in visible distortion of a compressed video image while still providing a desired output data rate. The parameter which may be varied to best advantage such as, for example, the threshold versus the quantizing factor, further varies as the data rate changes as a function of the information content of the image. Since the information content thereof changes, different sources of data and to a lesser degree different images are optimally quantized by different strategies. The distortion problem is particularly acute in many television applications in which reprocessed image quality is important. It also is acute in most of such applications that require multiple generations of compression, that is, multiple compression/decompression cycles, be made without noticeable degradation.

A basic consideration in the process of compressing data is that of bit allocation; that is, the determination of how many bits are allotted to each coefficient in a block of, for example, the cosine transform coefficients of previous mention. There are a given number of bits available for encoding, for example, a field of video, based on a channel bandwidth or on a capacity for storing the encoded data. Thus, a field of video lasts 1/60 of a second and is derived by scanning a pixel array of the order of 720 by 244 pixels. This is the source data rate. The object of the compression process is to reduce this data rate to fit it into a channel having a bit rate of a selected number of bits per second capacity, that is to fit it into a prescribed channel data space. Thus, for example, when dealing with cosine transform coefficients, a determination must be made concerning the proportion of available bits to allot to the low frequency coefficients of the field of video as well as to the high frequency coefficients. To this end, there are algorithms available for providing such bit allocations which allot the appropriate number of bits to the signals in proportion to their complexity. Relatively few bits are allotted to signals with little energy, with more bits allotted to signals of more energy, thereby minimizing the distortion in the image. An example of such an algorithm may be found in the article, Block Quantization of Correlated Gaussian Random Variables, Y. Hwang, et al., IEEE Trans. on Communication Systems, pp. 289-296, September, 1963.

Data representing images typically have more than one component defining the image at any particular location. For example, color images in a color television system consist of three components for each spatial location; a luminance component and two color difference components. There tends to be more detail in the luminance component, and the color difference components tend to define low color contrast. This is generally true in pictures of naturally occurring scenes. On the other hand, computer generated images such as provided in graphics systems may have strong detail and high contrast in the color difference components. Thus, in the process of bit allocation, if the analysis of how many bits are allotted to luminance and chrominance is based on natural scenes, a compression process performed on a graphics image will generally result in insufficient bits being allotted to the more complex chrominance.

The typical compromise made is that each component of the luminance and color difference components is assigned a certain fixed number of bits. In general, since the luminance contains more information than chrominance in the average natural scene, the greater proportion of total bits available per pixel are allotted to the luminance component than to the chrominance component. In such a situation, if the chrominance component with smaller bit allocation has high contrast and detail, as occurs frequently in the computer generated graphics of previous mention, the rendition of that component will be poor, resulting in poor overall image quality.

Variable length coding of compressed data such as performed in Huffman coding, requires that the degree of compression be adjusted so that the resulting coded data just fills the fixed data space available for it in the channel to be used. In the case of color television image data compression, in which the data has been transformed prior to encoding as, for example, by means of the discrete cosine transform process (DCT), the degree of compression may be controlled by selecting a quantizing factor which is applied to the amplitude coefficients of the frequency terms of the transformed image before encoding.

When separate amounts of bits within the data format, that is, data space, have been allocated to the luminance and chrominance components of the television signal, the quantizing factor must be determined for each component independently. Since the data space must be allocated in such a way as to provide for adequate performance in the "worst-case" situation of each component, situations frequently arise in which one component is distorted because it needs more data space, while the other component under-utilizes its space due to lower, or zero, needs in that particular image. A common case is when the image is of low color saturation or even uncolored such as in a monochrome image. Overall performance then is better if most or all of the chrominance data space is made available for luminance. Conversely, computer generated images with high chrominance content are best served if some luminance space is borrowed for use by the chrominance component, because a larger proportion of energy is concentrated in the chroma component. Thus the visual effect of noise in the chrominance is more visable due to an insufficient data allocation to the chroma component. That is, insufficient data space allocation results in more compression of the chrominance component by coarser quantization, which, in turn, results in increased distortion.

SUMMARY OF THE INVENTION

The present invention overcomes the shortcomings of the prior art of previous discussion, by providing a technique which allots more storage space or signal bandwidth to the signal component of greater complexity. To this end, the technique combines the encoding of the data components, whereby the component with the greater information content is allowed more bits in the compression process. This requires an appropriate organization of the data format, and the calculation of a "joint" quantizing factor to be used equally on, or with a fixed relationship between, the signal components.

The calculation of the joint quantizing factor may be done on either a closed-loop (feedback method) or iterating open-loop (feed forward method) basis but, for each calculation, considers the information content, or complexity, of both the luminance and chrominance components for the same part of the image, taken together. That is, the joint quantizer value is defined as a quantization value arrived upon by considering the information content of components of the image together (jointly) rather than independently. In this way, the calculation performed on a common portion of the image having low chrominance complexity allows the conveyance of more of the luminance information, and vice-versa.

The preferred embodiments of the invention to be described are designed especially to provide data compression for a pair of complementary signals such as, for example, the luminance and chrominance (composed of R-Y and B-Y components) component signals of a color television signal. The data is compressed in such a way that the encoded data is in formatted units of, for example, one field, each unit being approximately the same length as, but not exceeding, the space allotted in typical tape formatting for such digital data. That is, the number of bits to be recorded is less than or equal to the number allowed by the format's space on the recording tape, or in a selected data stream space as in a system where the data is being transmitted. In addition, it is preferable that the compressed data be recorded in individually decodable, data segments substantially smaller than one track in length. By conforming to these constraints, the format on the recording tape allows recovery of subsections of an image for purposes of editing and to insure picture-in-shuttle operation.

DESCRIPTION OF THE PREFERRED EMBODIMENTS

Figure 1:
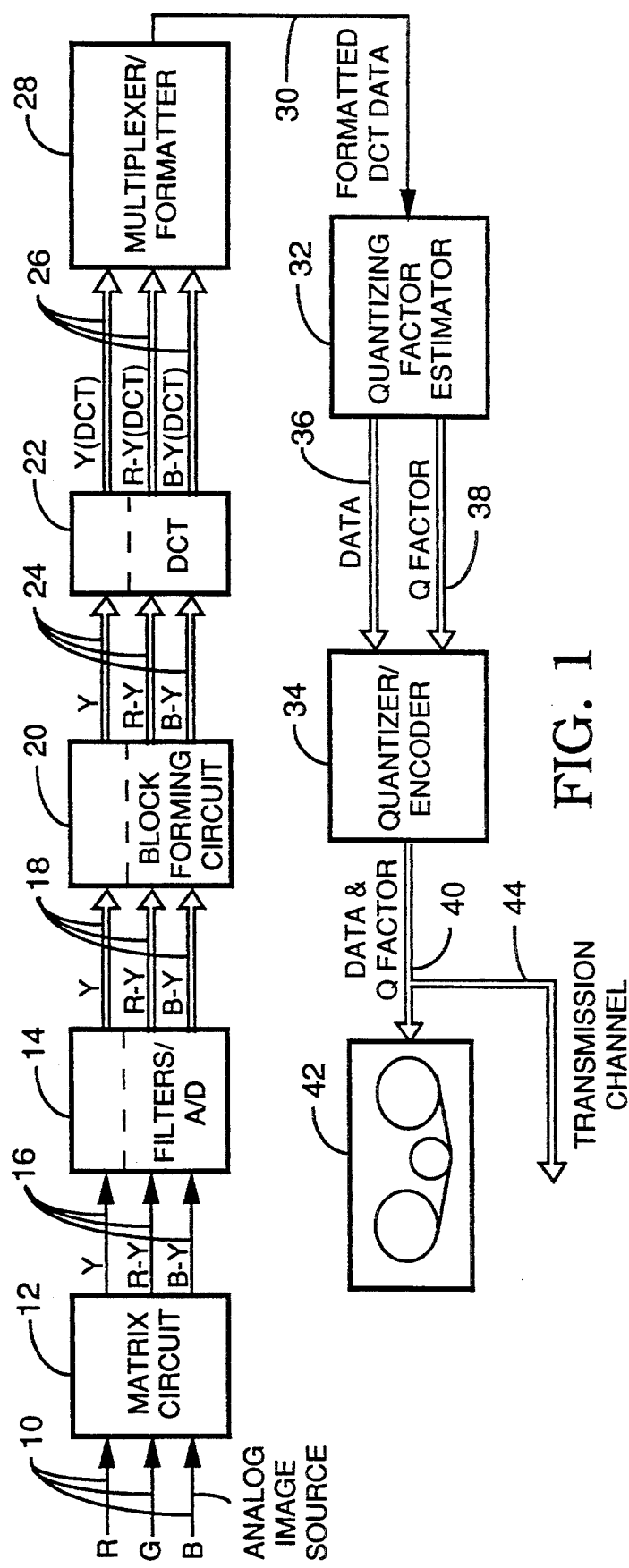
FIG. 1 is a block diagram of a compression/encoding system incorporating the invention combination.

In an implementation of the invention, the original image data is digitized, transformed and quantized before it is recorded or introduced into a transmission channel or the like. In a typical environment, and by way of description only, the image data is grouped into spatial "image blocks" of data, wherein each image block is formed of a selected array of pixels taken at a particular common location of the image, and wherein a selected plurality of image blocks are assembled to define successive "data sets". The pixels contain luminance and chrominance components corresponding to the image and its varying complexities. In accordance with the invention, a "joint" quantizing factor is calculated for one or more data sets, or for one or more image blocks, of the combined luminance and chrominance components derived from the common location.

To further illustrate the environments in which the invention is useful, there are two distinct methods of formatting on tape, and the grouping over which the quantizing factor remains fixed generally depends on the formatting method. These methods are block synchronization and interleaved synchronization.

Synchronization (sync) is needed to determine the relationship of the recovered data bits to the predetermined format. This is important because data must be grouped into segments of a certain length before error correction encoding is applied to the data. In playback, the segments must be identifiable so that error correction can be applied. There may be other special relationships between the format and the data in addition to the need for error correction. In the special case of video, the format may include information about where the data came from in the image.

For purposes of describing the invention, a blocked sync structure and data format is used herein. In this system, each sync word comes at the beginning of a group of data which represent one television line, wherein many television lines occur in one head pass on the tape. One advantage of having sync occur many times in one head pass is that it prevents a dropout in the sync word from causing complete loss of data for an entire head pass (namely, 52 lines of image). That is, if sync is lost, or not found immediately, there will be additional sync words immediately following to allow the recovery of the data. In this way, error propagation can be upper bounded to a single data sync block in length. The block sync method when used in conjunction with a fixed known data format related to the video, imposes a fixed allotment of bits for the video, whether recorded or transmitted. The available number of bits per track and the need for relatively frequent repetitions of the sync word result in relatively short data segments. When compressed image data is used to fill the data space, it is desirable that each group of data to be compressed have roughly the same amount of information content because, after compression, the data of each group are going to be forced to fit in the same space. This is why shuffling is used in the blocked sync structure type of format, because shuffling provides essentially the same amount of image information in each group of data.

Alternatively, if the interleaved sync structure of previous mention is used, there is less need to relate the synchronization to the video format. The only requirement is that over one field of video there is space allotted for one video field's worth of information. Since the sync bits are not disposed at the beginning of a selected group of recorded data as presently is done in conventional data communication or transmission systems, a rigid assignment of bits per data block does not exist, since there is no data block as such. The format of the sync and error correction coding (ecc) structure may be made more independent of the video data. Having the tape format independent of the video format removes the requirement for fixed allotments of space such as lines or groups of blocks for each video data unit. The only constraint then is that the video for one field fit in one field's worth of space on tape.

FIG. 1 is a block diagram exemplifying a compression/encoding system that incorporates the present invention. Original image data from an analog source, represented by the red (R), green (G) and blue (B) lines 10, are converted into color difference components in accordance with the well known CCIR-601 component color television standard. More particularly, by way of example only, the image data is defined by three components of the video signal; namely, a luminance component (Y) and two complementary chrominance components R-Y and B-Y. As previously mentioned,, each preselected image block is formed of a given number of pixels of the image. In this example, a Y block may comprise four pixels vertically and eight pixels horizontally. If the image data is a color signal, then the image blocks contain color information in the form of the chrominance components R-Y, B-Y, as well as the Y component, with each color component represented in this example, by respective superimposed image blocks of four pixels vertically and four pixels horizontally.

The process of converting the RGB data signals into color difference components is performed in FIG. 1 by a matrix circuit 12 in generally conventional fashion, to provide luminance (Y) and chrominance (R-Y, B-Y) component signals. The analog source which generates the RGB signals may be, for example, a video camera.

The luminance component and the chrominance R-Y and B-Y components are supplied to respective low pass filters and analog-to-digital converters, herein depicted as filter/A/D circuit 14, via lines 16, and are low pass filtered and converted from the analog to a digital data format. As depicted by a dashed line in block 14, at this point the luminance component is separately filtered and converted via a respective portion of the filter-/A/D circuit 14. Likewise, the two chrominance components are supplied to respective filters of equal bandwidth, and are converted by a respective A/D converter also within the circuit 14. As is well known in the CCIR 601 digital video standard, the chrominance components are sampled at half the rate of the luminance component, whereby a single A/D converter with two sample and hold circuits may be used to convert both chrominance components.

The filtered and digitized luminance and chrominance components from the filter/A/D circuit 14 are supplied via respective buses 18 to a block forming circuit 20, whereby the image blocks of previous mention may be placed in a prescribed order as desired. That is, the data to be transformed are usually formed into two-dimensional blocks before transformation. This necessarily is not the same as the time order of a raster scan of the original image. As depicted by the dashed line across the block, the luminance component of the image data is processed separately from the chrominance components in the block forming circuit 20 of the system, to provide independent streams of blocks of separate luminance and color difference image data.

By way of example only, the block forming circuit 20 for forming 4×8 pixel blocks may include, in a simple embodiment, a pair of memory banks, wherein each bank has four lines of memory. A first bank writes in video data as received in a temporal order of raster scan, starting at the top left corner of an image. After four lines of the image are scanned and stored, a switch is enabled which switches the inputs/outputs of the memory banks, whereby the first bank containing the four lines is then read out. However, instead of reading out the full lengths of the four lines in the first bank, the circuit 20 reads out four short segments of the four respective lines corresponding to the width of a block. Thus, the circuit 20 writes in data in line sequential order of the image and reads out data in temporal order of the blocks. In a modification, circuit 20 may have memory banks which can store a field of data, whereby an entire field may be read into memory before the switch is enabled. Then the short line segments corresponding to each block of data may be read out from the field of data in any selected order, whereby the blocks from anywhere in the field may be scrambled in order upon read out.

The image data comprising the luminance and color difference components in digital block form are suitably transformed, such as into discrete cosine transform (DCT) coefficients, by supplying the image data to a DCT circuit 22 via respective buses 24. The luminance and the chrominance components herein preferably are separately processed in the DCT circuit 22 as represented by the dashed line extending across the block to enhance the speed of the transform process.

The transformed Y, R-Y and B-Y data are supplied via respective buses 26 to a multiplexer/formatter circuit 28 to be selectively multiplexed together and formatted. To this end, the numerical values of the transform coefficients commensurate with the luminance and chrominance for each spatial location preferably are multiplexed into a single data stream. However, it is understood that while a single data stream is formed, the luminance data still is distinguishable from the chrominance data. Thus, in the example herein, the multiplexed and formatted data stream includes blocks of luminance data interspersed with corresponding blocks of chrominance data.

The formatted transform coefficients are supplied via a bus 30 to a quantizing factor estimator 32 wherein, by way of illustration only, a joint quantizing (Q) factor is calculated for each data set of 23 blocks of the formatted image data supplied on bus 30. Typical of such a Q factor estimator 32 is the feed forward estimation process described in U.S. patent application Ser. No. 07/560,606 filed Jul. 31, 1990, now U.S. Pat. No. 5,146,324 issued on Sep. 8, 1992, and assigned to the same assignee as this application, and incorporated by reference herein. By way of further example, a Q factor may be calculated for one or more image blocks of the image data. Thus, the invention techniques are equally applicable to various data formats. It also will be recognized by those skilled in the art that the particular manner in which the quantizing factor is calculated is not critical to the invention. For example, it may be estimated via a single measurement of the number of bits to encode the data at a known fixed value of Q factor, and a precomputed lookup table. The lookup table contains a value of Q factor for each measured number of bits.

In accordance with the invention, the luminance and chrominance transform coefficients for each spatial location are formatted together, as illustrated by the multiplexer/formatter circuit 28, whereby the calculation of a joint quantizing factor for the thusly combined luminance and chrominance components automatically takes into consideration the relationship of the information content of the respective components. That is, in the determination of the joint quantizing factor, the prescribed amount of bit space, that is, the length of a data sync block or the length of a continuous data stream space to be recorded or transmitted, is allotted for the combined luminance and chrominance components, not for each of the luminance or chrominance components separately. It follows that the quantizing factor estimator 32 must be aware of the format of the incoming data stream. That is, the quantizing factor estimator must compute its estimate of the Q factor based on the total information content of the luminance and chrominance samples from the same spatial location in the image, which herein is from the same block. To do so, the estimator needs to know where the first coefficient of the spatial group to be encoded is located in the incoming data format, as well as the location of the last coefficient from that same group.

The automatic allocation of more bits to the more complex signal component in accordance with the invention, inherently is performed in the encoding process. That is, if one signal is more complex, its transform coefficients will have higher numerical values. When these larger values are divided by the joint Q factor larger values result, which will be encoded in more bits in the Huffman encoding process, since, as previously discussed, larger values are assigned longer codewords. Thus more complex signals automatically are allotted more bits, or more data space, and vice versa.

It is noted here that it is not necessary to combine the signals in the multiplexer/formatter circuit 28, but since it is possible to run the quantizing factor estimator 32 and a quantizer/encoder circuit 34 (discussed below) at the data rate for the combined luminance/chrominance data rate (27 Mega samples/sec in CCIR-601) it is more economical to do so. In addition, formatting the data in groups such that the luminance and chrominance for the same spatial location occur close together in time, simplifies the design of the quantizing factor estimator 32 and quantizer/encoder circuit 34 by reducing memory requirements. A joint quantizing factor is calculated for one or more data sets or image blocks, based on how many bits are generated upon compression of the data, and whether the number of bits fit within the allotted length of the data sync block or of the data stream.

It should be noted that at this stage the quantizing factor may be either linearly or non-linearly weighted. That is, the step size may be fixed over the range of the values to be quantized, or they may vary so that, for example, the step size about zero is greater than the other step sizes. However, all of the characteristics of a spatial location on a displayed image are considered in combination when determining the value of the quantizing factor. Thus, in the television signal exemplified herein, since the luminance component and the two chrominance components are considered together in the calculation of the quantizing factor for a preselected block or blocks of combined image data, the invention technique automatically allots more bits to a more complex component signal of the combined signals, and less bits to the relatively less complex component. Any entropy encoder when well matched to the source it encodes will produce long code words for low probability events and short words for high probability events. Therefore, the component of the signal which carries more information, and more particularly the coefficients thereof, are lower probability terms which are larger in amplitude and thus are assigned longer codewords. If a component contains more information, it is allotted more bits since it has coefficients which are larger in amplitude overall, thus requiring the longer codewords.

The quantizing factor estimator 32 supplies the discrete cosine transform coefficients to the quantizer/encoder circuit 34 via a data bus 36, and also supplies the circuit 34 with the value of the calculated quantizing factor via a bus 38. The data is "quantized" by scaling each coefficient by the quantizing factor, rounding to the nearest integer, and coding the resulting value by means of an entropy encoder such as a Huffman encoder. For purposes of description, the term "quantized" or "quantizer" as employed herein is intended to represent the process of dividing a coefficient by the Q factor and rounding the resulting value to the nearest integer or, more generally, a process for providing a mapping from the coefficients and Q factors to the value that is entropy coded. It is understood that although the quantizer/encoder circuit 34 does establish the final quantized step size, the step size is only obtained when the scaled and rounded value is multiplied by the Q factor in the reproducing portion of the system.

The encoded data are supplied via a bus 40 to a suitable data recorder 42, or to a selected transmission channel 44 for further utilization. If, due to the nature of the quantizing factor estimation method, for example, the feed forward estimation method of Ser. No. 07/560,606 (now U.S. Pat. No. 5,146,324) of previous mention, it is necessary to furnish the quantizing factors for recording or transmission so that the signal may be properly converted to an image again, they are included in the signal flow in bus 40 or bus 44 along with the compressed and encoded data to which they individually relate.

One feature of the invention includes applying predetermined weighting functions to the individual transformed image data components, which define the individual characteristics of the image such as, for example, spatial frequency, at the selected spatial locations. For example, in order to take into account the sensitivity of the human eye to distortions of the image due to quantization, different weighting functions may be applied to the quantizing factor for each component and coefficient. Two basic rules which generally apply in the selection of the weighting functions are that, first, higher spatial frequency components and, second, color difference components, both allow greater distortion before the effects of the distortion are perceptible to the eye. Thus, a given bit rate may be achieved by a number of different quantization strategies. For example, equal quantizing error may be allowed for each spatial frequency or, alternatively, increasing quantizing error may be allowed at high spatial frequencies and/or greater quantizing error may be allowed in color difference signals.

Figure 2:
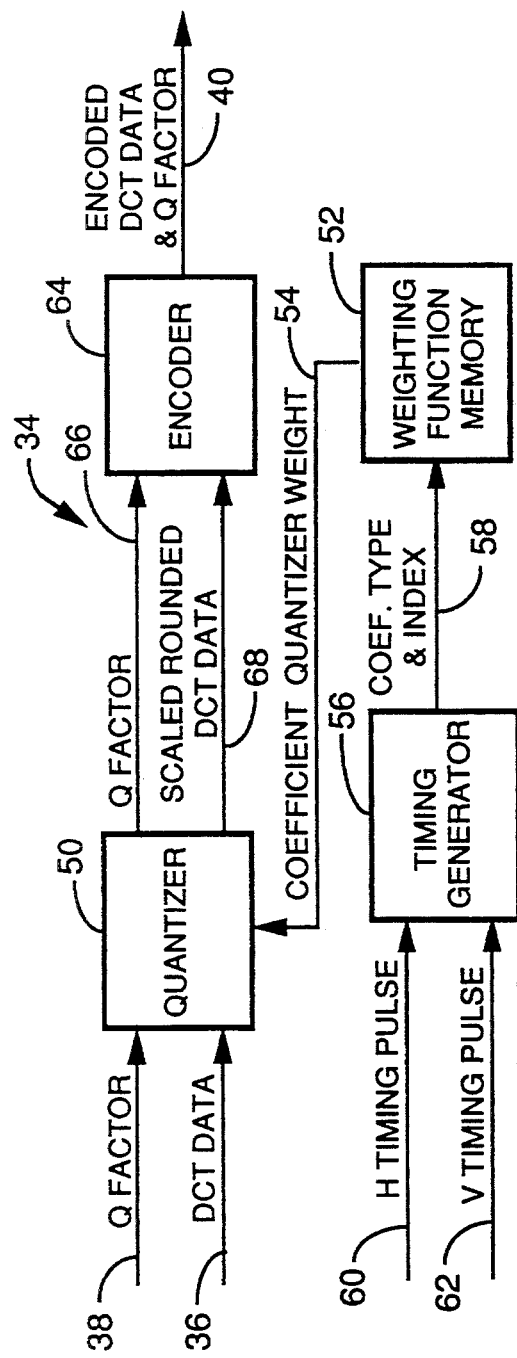
FIG. 2 is a block diagram illustrating in further detail the quantizer/encoder circuits of FIG. 1.

The particular example described herein includes applying predetermined weighting factors to the quantizing value as it is applied to compress the luminance and chrominance data. FIG. 2 is a more detailed block diagram of the quantizer/encoder circuit 34 of FIG. 1 which further illustrates this feature. As shown, the quantizing factor and the DCT data are supplied to a quantizer 50 of the quantizer/encoder circuit 34, via the buses 38, 36 respectively. As mentioned previously, the term "quantizer" is used to represent the process of scaling and rounding in the record portion of the signal compression/decompression system. The weighting functions are selectively furnished to the quantizer 50 by a weighting function memory 52, via a bus 54. Timing for output from memory 52 is determined by a timing generator 56 via a bus 58 in response to horizontal (H) and vertical (V) synchronization pulses supplied from system timing via lines 60, 62. The identification of the components Y, R-Y, B-Y and the index (location within the transform block) are supplied as binary coded values by the timing generator 56 on bus 58. These binary values are used as addresses into a table of weighting factors contained in the memory 52, which then are applied in conjunction with a quantizer value from the quantizer estimator 32 to determine the value of the quantizer applied to a particular coefficient.

Thus, the weighting factor for the component and the spatial frequency of the particular component within the transformed block, for each of the transformed components in the data stream, is stored in the memory 52 and is selectively read out at the appropriate time as determined by the timing generator 56. That is, a weighting factor for each two-dimensional spatial frequency in the transform block of the component type, i.e., luminance (Y) and R-Y or B-Y chrominance data, are read out of memory 52 at the appropriate time as initiated by the H and V synchronization pulses, whereby an appropriate weighting function is supplied to the quantizer 50. Such weighting functions are, for example, visibility weighting matrices defined in the baseline compression standard imposed by the Joint Photographic Experts Group (JPEG) which standards concern technical descriptions of, for example, encoding and decoding algorithms and the encoded data format. The visibility weighting is inversely proportional to the human observer's sensitivity to errors in the amplitude of the various coefficients in the DCT block. Since compression is achieved at the expense of accuracy of the coefficient numerical values with respect to those of the uncompressed image, it is beneficial to allow greater inaccuracy where it will be least noticable. The visibility weighting matricies express an approximate relationship between DCT coefficient index and quantizer value.

Further describing FIG. 2, once the DCT data is quantized, it is supplied to an encoder 64 of the quantizer/encoder circuit 34 of FIG. 1 via a bus 66, along with the Q factors on a bus 68, and is encoded. Although various encoding schemes may be utilized, Huffman coding is used in the arrangement described herein. As shown, the corresponding quantizing factors also are passed through the encoding process via the bus 68.

The encoded DCT data is supplied to the recorder 42 (FIG. 1) along with the quantizing factors for the data as needed, or the data and Q factors may be transmitted to other utilization apparatus such as a satellite. It is to be understood that if a method of feedback calculation of Q factors is used, and if no picture-in-shuttle is needed, the Q factor values need not be transmitted, but can be computed on the playback side of the system.

Figure 3:
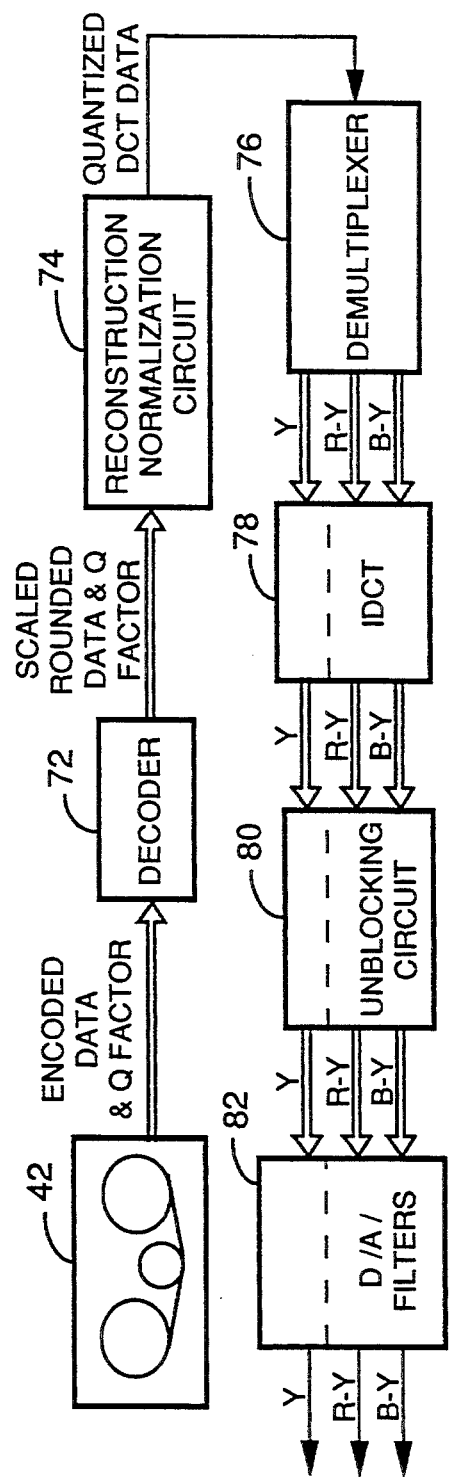
FIG. 3 is a block diagram of a decoding/decompression system for recovering the original data upon playback.

FIG. 3 is a block diagram illustrating a decoding/decompression system which per se is not part of the invention, but which is employed in the process of recovering the analog image data previously compressed and encoded. Thus, as depicted in FIG. 3 in generally conventional implementation, the encoded data and the Q factor used in the compression process are supplied from, for example, the recorder 42 of FIG. 1, to a decoder 72. The decoded data and Q factor are supplied to a reconstruction normalization circuit 74 and the normalized data consisting of DCT coefficients of the Y, R-Y and B-Y components are supplied to a demultiplexer 76. The demultiplexed data consisting of the separated Y, R-Y and B-Y DCT coefficients are inverse transformed via an inverse DCT circuit 78. The resulting Y, R-Y and B-Y blocked signal components are unblocked to provide a block-to-raster scan by an unblocking circuit 80, which includes memory which, in essence, performs the opposite function of the memory in the block forming circuit 20 of FIG. 1. The Y, R-Y and B-Y signal components then are converted back to the analog domain and are filtered via a D/A converter and filter circuit 82, thereby recovering the original analog signal components supplied to the filter/A/D circuit 14 of FIG. 1 on lines 16.

In accordance with the invention, the process of reconstructing the decoded data values in the reconstruction normalization circuit 74 multiplies the decoded scaled values by the scaling Q factor used in the scaling and rounding (that is, quantizing) process of FIG. 1. The Q factor is recovered, along with the compressed data, via the reproduce process of the recorder 42. If picture-in-shuttle is not a system requirement, the Q factor need not be transmitted through the channel if estimation of the Q factor is a causal process. That is, if the value of the Q factor is computed using only past values of encoding error, the value of the Q factor may be created at the receiver using decoded information.

Figure 4:
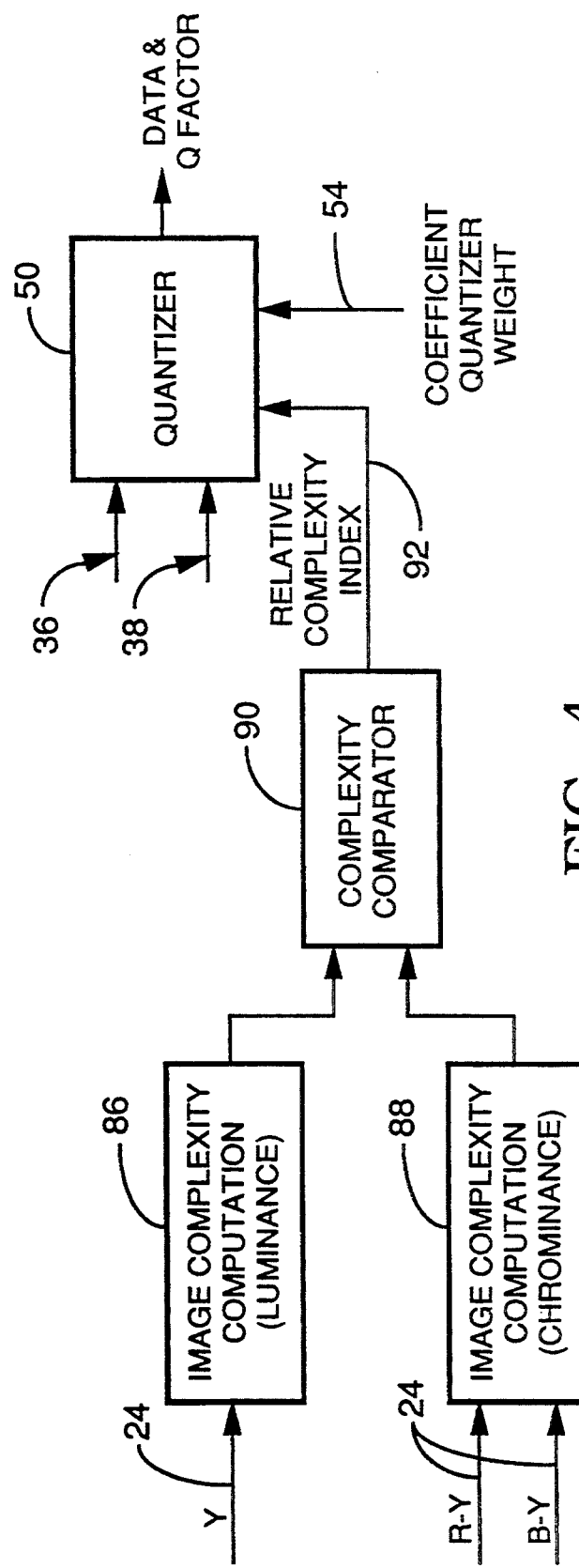
FIG. 4 is a block diagram illustrating a modification of the system of FIG. 1 commensurate with an alternative embodiment of the present invention.

FIG. 4 depicts an alternative embodiment of the invention which cooperates with the system of FIG. 1 to pre-determine the relative complexity of the signal components at a common location in an image, to thereby allow pre-assigning a commensurate number of bits to each signal component in proportion to its complexity. For example, if one signal component is more complex relative to another signal component, a relative complexity index indicative of the ratio or percentage of relative complexity is generated and is used to allot more bits of the data stream containing the compressed data to the more complex signal component, and less bits to the less complex signal component, derived from the common location in the image.

To this end, the circuit of FIG. 4 extracts the Y, R-Y and B-Y signal components supplied, for example, on buses 24 of FIG. 1, and supplies the Y component to a luminance image complexity computation circuit 86 and the R-Y and B-Y components to a chrominance image complexity computation circuit 88. The circuits 86, 88 determine the complexities of the respective signal components, as discussed further below, and supply the resulting digital values indicative thereof to a complexity comparator circuit 90. A relative complexity index is generated which may be, for example, a digital number indicative of the ratio of the complexities, which index is supplied to the quantizer 50 (FIG. 2) via a bus 92. The index is used to further modify the quantizing values used to quantize the coefficients of the respective Y and R-Y, B-Y signal components in response to the relative complexity of the components at the common location in the image, as pre-determined via the circuit of FIG. 4. The modification of the Q factor by the relative complexity index on bus 92 of the system of FIG. 4 is in addition to the modification of the Q factor by the coefficient quantizer weight on bus 54 of the system of FIG. 2 previously described. The relative complexity index allows a modification of the quantizing values applied to each of the signal components to enable the adaptive allotment of numbers of bits commensurate with the detected complexities of the components.

The image complexity computation circuits 86, 88 are similar and comprise adder/accumulators and arithmetic computational logic which computes the complexity in the image domain (not the transform domain). The complexity comparator circuit 90 comprises, for example, a read only memory containing a plurality of look up tables which represent a corresponding plurality of binary values defining the relative complexity index. Since there can be countless numbers of relative complexity values for the signal components, the circuit of FIG. 4 generally derives a coarse representation of the relative complexity index as, for example, by a quantization process. This reduces the number of look up tables contained in the comparator circuit 90. An example of an algorithm for estimating the complexity of a signal component in an image is illustrated in the article "A Bit Rate Controlled DCT Compression Algorithm For Digital Still Camera" M. Watanabe, et al., SPIE Vol. 1244, Image Processing Algorithms and Techniques, 1990, pgs. 234–238. Such an algorithm may be used in the complexity computation circuits 86, 88 of FIG. 4.

Although the invention has been described in connection with preferred embodiments, and with respect to exemplary signal format environments, it will be appreciated that various additional modifications and alternatives are contemplated. It is therefore intended that the coverage be limited only by the following claims and their equivalents.

What is claimed:

1. A method for compressing image data formed of two or more signal components of respective complexities at a common location in an image which together define a combined signal information content corresponding to the complexities, wherein the compressed image data defines a data stream formed of a preselected number of data bits comprising the steps of;
   selecting a joint quantizing factor from the combined signal information content corresponding to the complexities of said two or more signal components derived from the common image location, wherein each of the signal components are distinct from each other;
   detecting, prior to the step of selecting, a relative complexity index of the signal components taken from the common location in the image;
   performing said step of selecting by modifying said joint quantizing factor in response to the detected relative complexity index to pre-assign a proportion of said preselected number of data bits for each of the signal components during compression; and
   quantizing said signal components from said common image location in response to said joint quantizing factor to assign said proportion of said preselected number of data bits to each signal component in the dam stream in accordance with the respective complexities and thus the actual needs of the signal components from the common location.

2. Apparatus for compressing image data formed of two or more signal components having different characteristics and derived from a common location in an image, and wherein the compressed image data are allotted a preselected amount of data stream space, comprising:
   means for combining processed versions of the signal components taken from the common location into a combined data stream;
   means for determining a joint numerical processing parameter for the combined data stream which allots an amount of data stream space to each signal component in proportion to its complexity of the signal component, wherein the processing parameter is applied during compression to the combined data stream;
   means for detecting a relative complexity between said two or more signal components derived from the common location;
   means for generating a relative complexity index indicative of the relative complexity; and.
   means for modifying the joint numerical processing parameter in response to said relative complexity index.

3. The apparatus of claim 2 wherein:
   said detecting means includes image complexity detecting means responsive to said processed versions of the respective signal components, for detecting the relative complexity thereof; and
   said generating means includes complexity comparator means in the form of look-up tables representative of values of said relative complexity index.

4. Apparatus for compressing image data formed of two or more signal components derived from a common location in an image and having varying complexities, wherein the compressed image data is allotted a preselected data stream space, comprising:
   means for providing separate streams of data each formed of a respective signal component from said common location;
   means receiving said separate streams of data for generating respective streams of transform coefficients corresponding to said separate streams of data;
   means receiving said respective streams of transform coefficients for combining the transform coefficient streams into a combined stream of transform coefficients formed of distinct coefficients of said two or more signal components;
   means for determining a joint quantizing factor for the combined information content corresponding to the complexities of said two or more signal components from the common location, wherein each of the transform coefficients in the stream are distinct from each other;
   means for predetermining a relative complexity index between said two or more signal components derived from the common location;
   means for modifying said joint quantizing factor in response to the relative complexity index to pre-allot the amount of said data stream space to each signal component prior to applying the joint quantizing factor; and
   means for applying said joint quantizing factor to the combined stream of distinct transform coefficients to allot an amount of said data stream space to each signal component in proportion to the complexity of each signal component at the common location while fitting the compressed image data into said preselected data stream space.

5. The apparatus of claim 4 including:
   means coupled to said applying means for supplying a weighting value to the joint quantizing factor which varies for each transform coefficient in accordance with the characteristics of the signal component and with a human observer's visual sensitivity to errors in the signal component:
   said means for supplying including;
   a weighting function memory for storing weighting lookup tables indicative of said visual sensitivity to errors; and
   a timing generator for supplying, to said weighting function memory, component identification and index signals which identify the signal components.

6. The apparatus of claim 4 wherein said signal components comprise the luminance and chrominance at said common location in the image, and said combined stream is formed of cosine transform coefficients of one signal component distinctly interspersed with the cosine transform coefficients of another signal component.

7. A method for selecting a quantizing factor for two or more signals derived from a common location of an image and having different complexities, wherein application of the quantizing factor during quantization provides a stream of compressed signals confined to a preselected number of data bits, comprising the steps of:

supplying separate streams of data each representative of a respective signal from the common location;

combining the separate streams of data into a combined stream of signal data;

selecting a joint quantizing factor based on the combined stream of signal data, wherein said joint quantizing factor allots to each of the two or more signals a proportion of data bits commensurate with the respective complexity of the two or more signals, while confining the combined stream of signal data into said preselected number of data bits upon said quantization;

determining a relative complexity between said two or more signals at said common location;

generating, in response to the step of determining, an index signal indicative of the relative complexity; and modifying said joint quantizing factor in response to said index signal during the step of selecting.

8. The method of claim 7 wherein said two or more signals respectively define the luminance and chrominance of the image at said common location.

9. The method of claim 7 further including modifying said joint quantizing factor during quantization with a weighting function indicative of a human observer's sensitivity to errors in the two or more signals.

* * * * *